US008685344B2

(12) United States Patent
Sudarsan et al.

(10) Patent No.: US 8,685,344 B2
(45) Date of Patent: Apr. 1, 2014

(54) SURFACE ASSISTED FLUID LOADING AND DROPLET DISPENSING

(75) Inventors: Arjun Sudarsan, Cary, NC (US); Michael G. Pollack, Durham, NC (US); Vamsee K. Pamula, Durham, NC (US); Vijay Srinivasan, Durham, NC (US)

(73) Assignee: Advanced Liquid Logic, Inc., Morrisville, NC (US)

( * ) Notice: Subject to any disclaimer, the term of this patent is extended or adjusted under 35 U.S.C. 154(b) by 675 days.

(21) Appl. No.: 12/523,776

(22) PCT Filed: Jan. 22, 2008

(86) PCT No.: PCT/US2008/051627
§ 371 (c)(1),
(2), (4) Date: Jul. 20, 2009

(87) PCT Pub. No.: WO2008/091848
PCT Pub. Date: Jul. 31, 2008

(65) Prior Publication Data

US 2009/0304944 A1 Dec. 10, 2009

Related U.S. Application Data

(60) Provisional application No. 60/881,674, filed on Jan. 22, 2007, provisional application No. 60/980,330, filed on Oct. 16, 2007.

(51) Int. Cl.
*B01L 3/00* (2006.01)
*C02F 1/48* (2006.01)

(52) U.S. Cl.
USPC ........... 422/504; 422/500; 422/501; 422/502; 422/503; 422/509; 204/600; 204/660

(58) Field of Classification Search
USPC ......... 422/68.1, 500, 502–504, 509; 204/600, 204/660, 663
See application file for complete search history.

(56) References Cited

U.S. PATENT DOCUMENTS 4,636,785 A 1/1987 Le Pesant
5,181,016 A 1/1993 Lee et al.

(Continued)

FOREIGN PATENT DOCUMENTS

WO 0069565 A1 11/2000
WO 0073655 A1 12/2000

(Continued)

OTHER PUBLICATIONS

Jie Ding, "System level architectural optimization of semi-reconfigurable microfluidic system," M.S. Thesis, Duke University Dept of Electrical Engineering, 2000.

(Continued)

*Primary Examiner* — Brian R Gordon
(74) *Attorney, Agent, or Firm* — William A. Barrett; Ward & Smith, P.A.

(57) ABSTRACT

The present invention relates to surface assisted fluid loading and droplet dispensing on a droplet micro actuator. A droplet actuator is provided and includes one or more electrodes configured for conducting one or more droplet operations on a droplet operations surface of the substrate. The droplet actuator further includes a wettable surface defining a path from a fluid reservoir into a locus which is sufficiently near to one or more of the electrodes that activation of the one or more electrodes results in a droplet operation. Methods and systems are also provided.

46 Claims, 7 Drawing Sheets

(56) References Cited

U.S. PATENT DOCUMENTS 5,486,337 A * 1/1996 Ohkawa ........................ 422/502
6,130,098 A 10/2000 Handique et al.
6,294,063 B1 9/2001 Becker et al.
6,565,727 B1 5/2003 Shenderov
6,773,566 B2 8/2004 Shenderov
6,790,011 B1 9/2004 Le Pesant et al.
6,911,132 B2 * 6/2005 Pamula et al. ................ 204/600
6,924,792 B1 8/2005 Jessop
6,977,033 B2 12/2005 Becker et al.
6,989,234 B2 * 1/2006 Kolar et al. ................ 435/287.2
7,052,244 B2 5/2006 Fouillet et al.
7,163,612 B2 1/2007 Sterling et al.
7,211,223 B2 5/2007 Fouillet et al.
7,255,780 B2 8/2007 Shenderov
7,328,979 B2 2/2008 Decre et al.
7,329,545 B2 2/2008 Pamula et al.
7,439,014 B2 10/2008 Pamula et al.
7,458,661 B2 12/2008 Kim et al.
7,531,072 B2 5/2009 Roux et al.
7,547,380 B2 6/2009 Velev
7,569,129 B2 8/2009 Pamula et al.
7,641,779 B2 1/2010 Becker et al.
7,727,466 B2 6/2010 Meathrel et al.
7,727,723 B2 6/2010 Pollack et al.
7,759,132 B2 7/2010 Pollack et al.
7,763,471 B2 7/2010 Pamula et al.
7,767,147 B2 * 8/2010 Adachi et al. ................... 422/63
7,815,871 B2 10/2010 Pamula et al.
7,816,121 B2 10/2010 Pollack et al.
7,822,510 B2 10/2010 Paik et al.
7,851,184 B2 12/2010 Pollack et al.
7,875,160 B2 1/2011 Jary
7,901,633 B2 * 3/2011 Huh et al. ..................... 422/403
7,901,947 B2 3/2011 Pollack et al.
7,919,330 B2 4/2011 De Guzman et al.
7,922,885 B2 * 4/2011 Adachi et al. ................. 204/450
7,922,886 B2 4/2011 Fouillet et al.
7,939,021 B2 5/2011 Smith et al.
7,943,030 B2 5/2011 Shenderov
7,989,056 B2 8/2011 Plissonnier et al.
7,998,436 B2 8/2011 Pollack
8,007,739 B2 8/2011 Pollack et al.
8,048,628 B2 11/2011 Pollack et al.
8,075,754 B2 12/2011 Sauter-Starace et al.
8,092,664 B2 * 1/2012 Ulmanella .................... 204/600
8,093,064 B2 1/2012 Shah et al.
8,147,668 B2 4/2012 Pollack et al.
8,202,686 B2 6/2012 Pamula et al.
8,221,605 B2 7/2012 Pollack et al.
8,236,156 B2 8/2012 Sarrut et al.
8,287,711 B2 10/2012 Pollack et al.
8,304,253 B2 11/2012 Yi et al.
8,342,207 B2 1/2013 Raccurt et al.
8,349,276 B2 1/2013 Pamula et al.
8,389,297 B2 3/2013 Pamula et al.
8,394,249 B2 3/2013 Pollack et al.
8,444,836 B2 5/2013 Fouillet et al.
2002/0005354 A1 1/2002 Spence et al.
2002/0036139 A1 3/2002 Becker et al.
2002/0043463 A1 4/2002 Shenderov
2002/0058332 A1 5/2002 Quake et al.
2002/0143437 A1 10/2002 Handique et al.
2003/0164295 A1 9/2003 Sterling
2003/0183525 A1 10/2003 Elrod et al.
2003/0205632 A1 11/2003 Kim et al.
2004/0031688 A1 2/2004 Shenderov
2004/0055891 A1 3/2004 Pamula et al.
2004/0058450 A1 3/2004 Pamula et al.
2004/0086423 A1 * 5/2004 Wohlstadter et al. ........... 422/52
2004/0134854 A1 * 7/2004 Higuchi et al. ............... 210/634
2004/0231987 A1 11/2004 Sterling et al.
2005/0036908 A1 * 2/2005 Yu et al. .......................... 422/58
2005/0142037 A1 * 6/2005 Reihs ............................ 422/100
2006/0021875 A1 2/2006 Griffith et al.
2006/0054503 A1 3/2006 Pamula et al.
2006/0102477 A1 5/2006 Vann et al.
2006/0159585 A1 * 7/2006 Torres et al. .................... 422/51
2006/0164490 A1 7/2006 Kim et al.
2006/0165565 A1 * 7/2006 Ermakov ..................... 422/130
2006/0186048 A1 8/2006 Tan
2006/0194331 A1 8/2006 Pamula et al.
2006/0231398 A1 10/2006 Sarrut et al.
2006/0254933 A1 11/2006 Adachi et al.
2007/0023292 A1 2/2007 Kim et al.
2007/0037294 A1 2/2007 Pamula et al.
2007/0045117 A1 3/2007 Pamula et al.
2007/0064990 A1 3/2007 Roth
2007/0086927 A1 4/2007 Natarajan et al.
2007/0207513 A1 9/2007 Sorensen et al.
2007/0217956 A1 9/2007 Pamula et al.
2007/0241068 A1 10/2007 Pamula et al.
2007/0242105 A1 10/2007 Srinivasan et al.
2007/0242111 A1 10/2007 Pamula et al.
2007/0243634 A1 10/2007 Pamula et al.
2007/0267294 A1 11/2007 Shenderov
2007/0275415 A1 11/2007 Srinivasan et al.
2008/0006535 A1 1/2008 Paik et al.
2008/0038810 A1 2/2008 Pollack et al.
2008/0044893 A1 2/2008 Pollack et al.
2008/0044914 A1 2/2008 Pamula et al.
2008/0050834 A1 2/2008 Pamula et al.
2008/0053205 A1 3/2008 Pollack et al.
2008/0105549 A1 5/2008 Pamela et al.
2008/0124252 A1 5/2008 Marchand et al.
2008/0142376 A1 6/2008 Fouillet et al.
2008/0151240 A1 6/2008 Roth
2008/0210558 A1 9/2008 Sauter-Starace et al.
2008/0247920 A1 10/2008 Pollack et al.
2008/0264797 A1 10/2008 Pamula et al.
2008/0274513 A1 11/2008 Shenderov et al.
2008/0281471 A1 11/2008 Smith et al.
2008/0283414 A1 11/2008 Monroe et al.
2008/0302431 A1 12/2008 Marchand et al.
2008/0305481 A1 12/2008 Whitman et al.
2009/0014394 A1 1/2009 Yi et al.
2009/0042319 A1 2/2009 De Guzman et al.
2009/0127123 A1 5/2009 Raccurt et al.
2009/0134027 A1 5/2009 Jary
2009/0142564 A1 6/2009 Plissonnier et al.
2009/0155902 A1 6/2009 Pollack et al.
2009/0192044 A1 7/2009 Fouillet
2009/0260988 A1 10/2009 Pamula et al.
2009/0263834 A1 10/2009 Sista et al.
2009/0280251 A1 11/2009 De Guzman et al.
2009/0280475 A1 11/2009 Pollack et al.
2009/0280476 A1 11/2009 Srinivasan et al.
2009/0283407 A1 11/2009 Shah et al.
2009/0288710 A1 11/2009 Viovy et al.
2009/0291433 A1 11/2009 Pollack et al.
2009/0321262 A1 12/2009 Adachi et al.
2010/0025250 A1 2/2010 Pamula et al.
2010/0041086 A1 2/2010 Pamula et al.
2010/0048410 A1 2/2010 Shenderov et al.
2010/0096266 A1 4/2010 Kim et al.
2010/0126860 A1 5/2010 Srinivasan et al.
2010/0320088 A1 12/2010 Fouillet et al.
2010/0323405 A1 12/2010 Pollack et al.
2011/0104816 A1 5/2011 Pollack et al.
2012/0165238 A1 6/2012 Pamula et al.

FOREIGN PATENT DOCUMENTS

WO 2004029585 A1 4/2004
WO 2004030820 4/2004
WO 2005047696 A1 5/2005
WO 2006013303 A1 2/2006
WO 2006070162 A1 7/2006
WO 2006081558 8/2006
WO 2006124458 A2 11/2006
WO 2006127451 A2 11/2006
WO 2006134307 A1 12/2006
WO 2006138543 12/2006
WO 2007003720 A1 1/2007
WO 2007012638 A1 2/2007

(56) References Cited

FOREIGN PATENT DOCUMENTS

| | | | |
|---|---|---|---|
| WO | 2007033990 | A1 | 3/2007 |
| WO | 2007048111 | | 4/2007 |
| WO | 2007120240 | A2 | 10/2007 |
| WO | 2007120241 | A2 | 10/2007 |
| WO | 2007123908 | A2 | 11/2007 |
| WO | 2008051310 | A2 | 5/2008 |
| WO | 2008055256 | A3 | 5/2008 |
| WO | 2008068229 | A1 | 6/2008 |
| WO | 2008091848 | A2 | 7/2008 |
| WO | 2008098236 | A2 | 8/2008 |
| WO | 2008101194 | A2 | 8/2008 |
| WO | 2008106678 | A1 | 9/2008 |
| WO | 2008109664 | A1 | 9/2008 |
| WO | 2008112856 | A1 | 9/2008 |
| WO | 2008116209 | A1 | 9/2008 |
| WO | 2008116221 | A1 | 9/2008 |
| WO | 2008118831 | A2 | 10/2008 |
| WO | 2008124846 | A2 | 10/2008 |
| WO | 2008131420 | A2 | 10/2008 |
| WO | 2008134153 | A1 | 11/2008 |
| WO | 2009002920 | A1 | 12/2008 |
| WO | 2009003184 | A1 | 12/2008 |
| WO | 2009011952 | A1 | 1/2009 |
| WO | 2009021173 | A1 | 2/2009 |
| WO | 2009021233 | A2 | 2/2009 |
| WO | 2009026339 | A2 | 2/2009 |
| WO | 2009029561 | A2 | 3/2009 |
| WO | 2009032863 | A2 | 3/2009 |
| WO | 2009052095 | A1 | 4/2009 |
| WO | 2009052123 | A2 | 4/2009 |
| WO | 2009052321 | A2 | 4/2009 |
| WO | 2009052345 | | 4/2009 |
| WO | 2009052348 | A2 | 4/2009 |
| WO | 2009076414 | | 6/2009 |
| WO | 2009086403 | A2 | 7/2009 |
| WO | 2009111769 | A2 | 9/2009 |
| WO | 2009135205 | A2 | 11/2009 |
| WO | 2009137415 | A2 | 11/2009 |
| WO | 2009140373 | A2 | 11/2009 |
| WO | 2009140671 | A2 | 11/2009 |
| WO | 2010004014 | A1 | 1/2010 |
| WO | 2010006166 | A2 | 1/2010 |

OTHER PUBLICATIONS

Moon, Hyejin, Ph.D., "Electrowetting-on-dielectric microfluidics: Modeling, physics, and MALDI application," University of California, Los Angeles, 2005.

Pollack et al., "Electrowetting-Based Actuation of Droplets for Integrated Microfluidics," Lab on a Chip (LOC), vol. 2, pp. 96-101, 2002.

Vijay Srinivasan, Vamsee K. Pamula, Richard B. Fair, "An integrated digital microfluidic lab-on-a-chip for clinical diagnostics on human physiological fluids," Lab on a Chip (LOC), vol. 4, pp. 310-315, 2004.

Chakrabarty, "Automated Design of Microfluidics-Based Biochips: connecting Biochemistry of Electronics CAD", IEEE International Conference on Computer Design, San Jose, CA, Oct. 1-4, 2006, 93-100.

Chakrabarty et al., "Design Automation Challenges for Microfluidics-Based Biochips", DTIP of MEMS & MOEMS, Montreux, Switzerland, Jun. 1-3, 2005.

Chakrabarty et al., "Design Automation for Microfluidics-Based Biochips", ACM Journal on Engineering Technologies in Computing Systems, 1(3), 2005, 186-223.

Chakrabarty, "Design, Testing, and Applications of Digital Microfluidics-Based Biochips", Proceedings of the 18th International Conf. on VLSI held jointly with 4th International Conf. on Embedded Systems Design (VLSID'05), IEEE, 2005.

Cotten et al., "Digital Microfluidics: a novel platform for multiplexed detection of lysosomal storage diseases", Abstract # 3747.9. Pediatric Academic Society Conference, 2008.

Delattre et al., "Towards an industrial fabrication process for electrowetting chip using standard MEMS Technology", μTAS2008, San Diego; poster presented, Oct. 15, 2008.

Delattre et al., "Towards an industrial fabrication process for electrowetting chip using standard MEMS Technology", μTAS2008, San Diego; Abstract in proceedings, Oct. 13-16, 2008, 1696-1698.

Dewey, "Towards a Visual Modeling Approach to Designing Microelectromechanical System Transducers", Journal of Micromechanics and Microengineering, vol. 9, Dec. 1999, 332-340.

Dewey et al., "Visual modeling and design of microelectromechanical system tansducers", Microelectronics Journal, vol. 32, Apr. 2001, 373-381.

Fair et al., "A Micro-Watt Metal-Insulator-Solution-Transport (MIST) Device for Scalable Digital Bio-Microfluidic Systems", IEEE IEDM Technical Digest, 2001, 16.4.1-4.

Fair et al., "Bead-Based and Solution-Based Assays Performed on a Digital Microfluidic Platform", Biomedical Engineering Society (BMES) Fall Meeting, Baltimore, MD, Oct. 1, 2005.

Fair, "Biomedical Applications of Electrowetting Systems", 5th International Electrowetting Workshop, Rochester, NY, 2006.

Fair et al., "Chemical and Biological Applications of Digital-Microfluidic Devices", IEEE Design & Test of Computers, vol. 24(1), Jan.-Feb. 2007, 10-24.

Fair, "Digital microfluidics: is a true lab-on-a-chip possible?", Microfluid Nanofluid, vol. 3, 2007, 245-281.

Fair et al., "Electrowetting-based On-Chip Sample Processing for Integrated Microfluidics", IEEE Inter. Electron Devices Meeting (IEDM), 2003, 32.5.1-32.5.4.

Fair et al., "Integrated chemical/biochemical sample collection, preconcentration, and analysis on a digital microfluidic lab-on-a-chip platform", Lab-on-a-Chip: Platforms, Devices, and Applications, Conf. 5591, SPIE Optics East, Philadelphia, Oct. 25-28, 2004.

Fair, "Scaling of Digital Microfluidic Devices for Picoliter Applications", The 6th International Electrowetting Meeting, Aug. 20-22, 2008.

Fouillet, "Bio-Protocol Integration in Digital Microfluidic Chips", The 6th International Electrowetting Meeting, Aug. 20-22, 2008.

Fouillet et al., "Design and Validation of a Complex Generic Fluidic Microprocessor Based on EWOD Droplet for Biological Applications", 9th International Conference on Miniaturized Systems for Chem and Life Sciences, Boston, MA, Oct. 9-13, 2005, 58-60.

Fouillet et al., "Digital microfluidic design and optimization of classic and new fluidic functions for lab on a chip systems", Microfluid Nanofluid, vol. 4, 2008, 159-165.

Hua et al., "Rapid Detection Of Methicillin-Resistant Staphylococcus Aureus (MRSA) Using Digital Microfluidics", Proc. μTAS, 2008.

Jary et al., "SmartDrop, Microfluidics for Biology", Forum 4i 2009, Grenoble, France; Flyer distributed at booth, May 14, 2009.

Kleinert et al., "Electric Field-Assisted Convective Assembly of Large-Domain Colloidal Crystals", The 82nd Colloid & Surface Science Symposium, ACS Division of Colloid & Surface Science, North Carolina State University, Raleigh, NC. www.colloids2008.org., Jun. 15-18, 2008.

Marchand et al., "Organic Synthesis in Soft Wall-Free Microreactors: Real-Time Monitoring of Fluorogenic Reactions", Analytical Chemistry, vol. 80, 2008, 6051-6055.

Millington et al., "Digital Microfluidics: a novel platform for multiplexed detection of LSDs with potential for newborn screening", Association of Public Health Laboratories Annual Conference, San Antonio, TX, Nov. 4, 2008.

Millington et al., "Digital Microfluidics: A Novel Platform For Multiplexing Assays Used In Newborn Screening", Proceedings of the7th International and Latin American Congress. Oral Presentations. Rev Invest Clin; vol. 61 (Supl. 1), 2009, 21-33.

Paik et al., "A digital-microfluidic approach to chip cooling", IEEE Design & Test of Computers, vol. 25, Jul. 2008, 372-381.

Paik et al., "Active cooling techniques for integrated circuits", IEEE Transactions on VLSI, vol. 16, No. 4, 2008, 432-443.

Paik et al., "Adaptive Cooling of Integrated Circuits Using Digital Microfluidics", accepted for publication in IEEE Transactions on VLSI Systems, 2007, and Artech House, Norwood, MA, 2007.

Paik, "Adaptive Hot-Spot Cooling of Integrated Circuits Using Digital Microfluidics", Dissertation, Dept. of Electrical and Computer Engineering, Duke University, Apr. 25, 2006, 1-188.

(56) References Cited

OTHER PUBLICATIONS

Paik et al., "Adaptive hot-spot cooling of integrated circuits using digital microfluidics", Proceedings ASME International Mechanical Engineering Congress and Exposition, Orlando, Florida, USA. IMECE2005-81081, Nov. 5-11, 2005, 1-6.
Paik et al., "Coplanar Digital Microfluidics Using Standard Printed Circuit Board Processes", 9th Int'l Conf. on Miniaturized Systems for Chemistry and Life Sciences, Boston, MA, Oct. 9-13, 2005, 566-68.
Paik et al., "Droplet-Based Hot Spot Cooling Using Topless Digital Microfluidics on a Printed Circuit Board", Int'l Workshops on Thermal Investigations of ICs and Systems (THERMINIC), 2005, 278-83.
Paik et al., "Electrowetting-based droplet mixers for microfluidic systems", Lab on a Chip (LOC), vol. 3. (more mixing videos available, along with the article, at LOC's website), 2003, 28-33.
Paik et al., "Programmable Flow-Through Real Time PCR Using Digital Microfluidics", 11th International Conference on Miniaturized Systems for Chemistry and Life Sciences, Paris, France, Oct. 7-11, 2007, 1559-1561.
Paik et al., "Rapid Droplet Mixers for Digital Microfluidic Systems", Masters Thesis, Duke Graduate School., 2002, 1-82.
Paik et al., "Rapid droplet mixers for digital microfluidic systems", Lab on a Chip, vol. 3. (More mixing videos available, along with the article, at LOC's website.), 2003, 253-259.
Paik et al., "Thermal effects on Droplet Transport in Digital Microfluids with Application to Chip Cooling Processing for Integrated Microfluidics", International Conference on Thermal, Mechanics, and Thermomechanical Phenomena in Electronic Systems (ITherm), 2004, 649-654.
Pamula et al., "A droplet-based lab-on-a-chip for colorimetric detection of nitroaromatic explosives", Proceedings of Micro Electro Mechanical Systems, 2005, 722-725.
Pamula et al., "Cooling of integrated circuits using droplet-based microfluidics", Proc. ACM Great Lakes Symposium on VLSI, Apr. 2003, 84-87.
Pamula et al., "Digital microfluidic lab-on-a-chip for protein crystallization", 5th Protein Structure Initiative "Bottlenecks"Workshop, NIH, Bethesda, MD, Apr. 13-14, 2006, 1-16.
Pamula et al., "Microfluidic electrowetting-based droplet mixing", Proceedings, MEMS Conference Berkeley, Aug. 24-26, 2001, 8-10.
Pamula, "Sample Preparation and Processing using Magnetic Beads on a Digital Microfluidic Platform", CHI's Genomic Sample Prep, San Francisco, CA, Jun. 9-10, 2009.
Pollack et al., "Electrowetting-based actuation of liquid droplets for microfluidic applications", Appl. Phys. Letters, vol. 77, No. 11, Sep. 11, 2000, 1725-1726.
Pollack, "Electrowetting-based Microactuation of Droplets for Digital Microfluidics", PhD Thesis, Department of Electrical and Computer Engineering, Duke University, 2001.
Pollack et al., "Electrowetting-Based Microfluidics for High—Throughput Screening", smallTalk 2001 Conference Program Abstract, San Diego, Aug. 27-31, 2001, 149.
Pollack, "Lab-on-a-chip platform based digital microfluidics", The 6th International Electrowetting Meeting, Aug. 20-22, 2008.
Ren et al., "Automated electrowetting-based droplet dispensing with good reproducibility", Proc. Micro Total Analysis Systems (mTAS), 7th Int. Conf.on Miniaturized Chem and Biochem Analysis Systems, Squaw Valley, CA, Oct. 5-9, 2003, 993-996.
Ren et al., "Automated on-chip droplet dispensing with vol. control by electro-wetting actuation and capacitance metering", Sensors and Actuators B: Chemical, vol. 98, Mar. 2004, 319-327.
Ren et al., "Design and testing of an interpolating mixing architecture for electrowetting-based droplet-on-chip chemical dilution", Transducers, 12th International Conference on Solid-State Sensors, Actuators and Microsystems, 2003, 619-622.
Ren et al., "Dynamics of electro-wetting droplet transport", Sensors and Actuators B (Chemical), vol. B87, No. 1, Nov. 15, 2002, 201-206.
Ren et al., "Micro/Nano Liter Droplet Formation and Dispensing by Capacitance Metering and Electrowetting Actuation", IEEE-NANO, 2002, 369-372.
Rival et al., "Towards Single Cells Gene Expression on EWOD Lab On Chip", ESONN 2008, Grenoble, France; Poster presented, Aug. 26, 2008.
Rival et al., "Towards single cells gene expression preparation and analysis on ewod lab on chip", Nanobio Europe 2009, Poster distributed at conference, Jun. 16-18, 2009.
Rival et al., "Towards single cells gene expression preparation and analysis on ewod lab on chip", Lab On Chip Europe 2009 poster distributed at Conference, May 19-20, 2009.
Rouse et al., "Digital microfluidics: a novel platform for multiplexing assays used in newborn screening", Poster 47, 41st AACC's Annual Oak Ridge Conference Abstracts, Clinical Chemistry, vol. 55, 2009, 1891.
Sista et al., "96-Immunoassay Digital Microfluidic Multiwell Plate", Proc. µTAS, 2008.
Sista, "Development of a Digital Microfluidic Lab-on-a-Chip for Automated Immunoassays with Magnetically Responsive Beads", PhD Thesis, Department of Chemical Engineering, Florida State University, 2007.
Sista et al., "Development of a digital microfluidic platform for point of care testing", Lab on a chip, vol. 8, Dec. 2008, First published as an Advance Article on the web, Nov. 5, 2008, 2091-2104.
Sista et al., "Heterogeneous immunoassays using magnetic beads on a digital microfluidic platform", Lab on a Chip, vol. 8, Dec. 2008, First published as an Advance Article on the web, Oct. 14, 2008, 2188-2196.
Srinivasan et al., "3-D imaging of moving droplets for microfluidics using optical coherence tomography", Proc. 7th International Conference on Micro Total Analysis Systems (µTAS), Squaw Valley, CA, Oct. 5-9, 2003, 1303-1306.
Srinivasan et al., "A digital microfluidic biosensor for multianalyte detection", Proc. IEEE 16th Annual Int'l Conf. on Micro Electro Mechanical Systems Conference, 2003, 327-330.
Srinivasan, "A Digital Microfluidic Lab-on-a-Chip for Clinical Diagnostic Applications", Ph.D. thesis, Dept of Electrical and Computer Engineering, Duke University, 2005.
Srinivasan et al., "Clinical diagnostics on human whole blood, plasma, serum, urine, saliva, sweat and tears on a digital microfluidic platform", Proc. 7th International Conference on Micro Total Analysis Systems (µTAS), Squaw Valley, CA, Oct. 5-9, 2003, 1287-1290.
Srinivasan et al., "Digital Microfluidic Lab-on-a-Chip for Protein Crystallization", The 82nd ACS Colloid and Surface Science Symposium, 2008.
Srinivasan et al., "Digital Microfluidics: a novel platform for multiplexed detection of lysosomal storage diseases for newborn screening", AACC Oak Ridge Conference Abstracts, Clinical Chemistry, vol. 54, 2008, 1934.
Srinivasan et al., "Droplet-based microfluidic lab-on-a-chip for glucose detection", Analytica Chimica Acta, vol. 507, No. 1, 2004, 145-150.
Srinivasan et al., "Low cost digital microfluidic platform for protein crystallization", Enabling Technologies for Structural Biology, NIGMS Workshop, Bethesda, MD., Mar. 4-6, 2009, J-23.
Srinivasan et al., "Protein Stamping for MALDIi Mass Spectrometry Using an Electrowetting-based Microfluidic Platform", Lab-on-a-Chip: Platforms, Devices, and Applications, Conf. 5591, SPIE Optics East, Philadelphia, Oct. 25-28, 2004.
Su et al., "Yield Enhancement of Digital Microfluidics-Based Biochips Using Space Redundancy and Local Reconfiguration", Proc. Design, Automation and Test in Europe (DATE) Conf., IEEE, 2005, 1196-1201.
Sudarsan et al., "Printed circuit technology for fabrication of plastic based microfluidic devices", Analytical Chemistry vol. 76, No. 11, Jun. 1, 2004, Previously published online, May 2004, 3229-3235.
Thwar et al., "DNA sequencing using digital microfluidics", Poster 42, 41st AACC's Annual Oak Ridge Conference Abstracts, Clinical Chemistry vol. 55, 2009, 1891.
Wang et al., "Droplet-based micro oscillating-flow PCR chip", J. Micromechanics and Microengineering, vol. 15, 2005, 1369-1377.

(56) References Cited

OTHER PUBLICATIONS

Wang et al., "Efficient in-droplet separation of magnetic particles for digital microfluidics", Journal of Micromechanics and Microengineering, vol. 17, 2007, 2148-2156.

Xu et al., "A Cross-Referencing-Based Droplet Manipulation Method for High-Throughput and Pin-Constrained Digital Microfluidic Arrays", Proceedings of conference on Design, Automation and Test in Europe (DATE), Apr. 2007.

Xu et al., "Automated Design of Pin-Constrained Digital Microfluidic Biochips Under Droplet-Interference Constraints", ACM Journal on Emerging Technologies is Computing Systems, vol. 3(3), 2007, 14:1-14:23.

Xu et al., "Automated, Accurate and Inexpensive Solution-Preparation on a Digital Microfluidic Biochip", Proc. IEEE Biomedical Circuits and Systems Conference (BioCAS), 2008, 301-304.

Xu et al., "Defect-Aware Synthesis of Droplet-Based Microfluidic Biochips", IEEE, 20th International Conference on VLSI Design, 2007.

Xu et al., "Design and Optimization of a Digital Microfluidic Biochip for Protein Crystallization", Proc. IEEE/ACM International Conference on Computer-Aided Design (ICCAD), Nov. 2008, 297-301.

Xu et al., "Digital Microfluidic Biochip Design for Protein Crystallization", IEEE-NIH Life Science Systems and Applications Workshop, LISA, Bethesda, MD, Nov. 8-9, 2007, 140-143.

Xu et al., "Droplet-Trace-Based Array Partitioning and a Pin Assignment Algorithm for the Automated Design of Digital Microfluidic Biochips", CODES, 2006, 112-117.

Xu et al., "Integrated Droplet Routing in the Synthesis of Microfluidic Biochips", IEEE, 2007, 948-953.

Xu et al., "Parallel Scan-Like Test and Multiple-Defect Diagnosis for Digital Microfluidic Biochips", IEEE Transactions on Biomedical Circuits and Systems, vol. 1(2), Jun. 2007, 148-158.

Xu et al., "Parallel Scan-Like Testing and Fault Diagnosis Techniques for Digital Microfluidic Biochips", Proceedings of the 12th IEEE European Test Symposium (ETS), Freiburg, Germany, May 20-24, 2007, 63-68.

Yi et al., "Channel-to-droplet extractions for on-chip sample preparation", Solid-State Sensor, Actuators and Microsystems Workshop (Hilton Head '06), Hilton Head Island, SC, Jun. 2006, 128-131.

Yi et al., "Characterization of electrowetting actuation on addressable single-side coplanar electrodes", Journal of Micromechanics and Microengineering, vol. 16.,Oct. 2006 http://dx.doi.org/10.1088/0960-1317/16/10/018, published online at stacks.iop.org/JMM/16/2053, Aug. 25, 2006, 2053-2059.

Yi et al., "EWOD Actuation with Electrode-Free Cover Plate", Digest of Tech. papers, 13th International Conference on Solid-State Sensors, Actuators and Microsystems (Transducers '05), Seoul, Korea, Jun. 5-9, 2005, 89-92.

Yi et al., "Geometric surface modification of nozzles for complete transfer of liquid drops", Solid-State Sensor, Actuator and Microsystems Workshop, Hilton Head Island, South Carolina, Jun. 6-10, 2004, 164-167.

Yi, "Soft Printing of Biofluids for Micro-arrays: Concept, Principle, Fabrication, and Demonstration", Ph.D. dissertation, UCLA, 2004.

Yi et al., "Soft Printing of Droplets Digitized by Electrowetting", Transducers 12th Int'l Conf. on Solid State Sensors, Actuators and Microsystems, Boston, Jun. 8-12, 2003, 1804-1807.

Yi et al., "Soft Printing of Droplets Pre-Metered by Electrowetting", Sensors and Actuators A: Physical, vol. 114, Jan. 2004, 347-354.

Zeng et al., "Actuation and Control of Droplets by Using Electrowetting-on-Dielectric", Chin. Phys. Lett., vol. 21(9), 2004, 1851-1854.

Zhao et al., "Droplet Manipulation and Microparticle Sampling on Perforated Microfilter Membranes", J. Micromech. Microeng., vol. 18, 2008, 1-11.

Zhao et al., "In-droplet particle separation by travelling wave dielectrophoresis (twDEP) and EWOD", Solid-State Sensor, Actuators and Microsystems Workshop (Hilton Head '06), Hilton Head Island, SC, Jun. 2006, 181-184.

Zhao et al., "Micro air bubble manipulation by electrowetting on dielectric (EWOD): transporting, splitting, merging and eliminating of bubbles", Lab on a chip, vol. 7, 2007, First published as an Advance Article on the web, Dec. 4, 2006, 273-280.

Zhao et al., "Microparticle Concentration and Separation byTraveling-Wave Dielectrophoresis (twDEP) for Digital Microfluidics", J. Microelectromechanical Systems, vol. 16, No. 6, Dec. 2007, 1472-1481.

* cited by examiner

SURFACE ASSISTED FLUID LOADING AND DROPLET DISPENSING

2 RELATED APPLICATIONS

In addition to the patent applications cited herein, each of which is incorporated herein by reference, this patent application is related to U.S. patent application Ser. No. 60/881,674, filed on Jan. 22, 2007, entitled "Surface assisted fluid loading and droplet dispensing" and U.S. Patent Application No. 60/980,330, filed on Oct. 16, 2007, entitled "Surface assisted fluid loading and droplet dispensing," the entire disclosures of which are incorporated herein by reference.

1 GRANT INFORMATION

This invention was made with government support under DK066956-02 and GM072155-02 awarded by the National Institutes of Health of the United States. The United States Government has certain rights in the invention.

3 FIELD OF THE INVENTION

The present invention relates generally to droplet operations, and more particularly to surface assisted fluid loading and droplet dispensing on a droplet microactuator.

4 BACKGROUND OF THE INVENTION

Droplet actuators are used to conduct a wide variety of droplet operations. A droplet actuator typically includes two plates separated by a gap to form a chamber. The plates include electrodes for conducting droplet operations. The chamber is typically filled with a filler fluid that is immiscible with the fluid that is to be manipulated on the droplet actuator. Surfaces of the chamber are typically hydrophobic. Introducing liquids, such as aqueous samples, into a droplet actuator loaded with filler fluid can be challenging due to the inherent difficulty of interfacing the droplet actuator with conventional liquid-handling tools as well as the tendency of the hydrophobic chamber to resist the introduction of non-wetting aqueous samples. Typically, a pipette is used to temporarily form a seal with a loading port on the droplet actuator and the liquid is injected under pressure from the pipette, but there are numerous problems with this approach which make it ineffective for untrained users. For example, the pipette must be filled completely to the end, and the seal between the pipette and the loading port of the droplet actuator must be very tight to avoid the introduction of air bubbles or loss of sample. Additionally, the displacement of liquid within the pipette must be very carefully controlled to avoid underfilling or overfilling the droplet actuator. There is a need for an approach to loading fluid onto a droplet actuator which avoids these problems and is simple enough to be used by an untrained user.

5 BRIEF DESCRIPTION OF THE INVENTION

According to one embodiment of the present invention, a droplet actuator is provided and comprises a first substrate and a second substrate. The first substrate comprises one or more electrodes configured for conducting one or more droplet operations. The second substrate is arranged in relation to the first substrate and spaced from the surface of the first substrate by a distance to define a space between the first substrate and second substrate, wherein the distance is sufficient to contain a droplet disposed in the space. the first or second substrate comprises a wettable surface defining a path from a position accessible to an exterior locus of the droplet actuator into an internal locus of the droplet actuator sufficient to: (i) cause a fluid from the external locus to flow from the external locus to the internal locus, or (ii) permit fluid to be forced into the internal locus by a force sufficient to traverse the wettable surface without extending sufficiently beyond the internal locus. The internal locus is in sufficient proximity to one or more of the electrodes such that activation of the one or more electrodes results in a droplet operation.

According to another embodiment of the present invention, a droplet actuator is provided and comprises one or more electrodes configured for conducting one or more droplet operations on a droplet operations surface of the substrate. The droplet actuator also comprises a wettable surface defining a path from a fluid reservoir into a locus which is sufficiently near to one or more of the electrodes that activation of the one or more electrodes results in a droplet operation.

According to yet another embodiment of the present invention, a droplet actuator is provided and comprises one or more electrodes configured for conducting one or more droplet operations on a droplet operations surface of the substrate. The droplet actuator also comprises a wettable surface defining a path from a first portion of the substrate into a locus which is sufficiently near to one or more of the electrodes that activation of the one or more electrodes results in a droplet operation.

According to a further embodiment of the present invention, a droplet actuator is provided and comprises a base substrate and a top plate separated to form a gap, wherein the base substrate comprises: (i) a hydrophobic surface facing the gap; and (ii) electrodes arranged to conduct droplet operations in the gap. The droplet actuator further comprises a reservoir in the gap or in fluid communication with the gap and a wettable path, the wettable path provided on one or more droplet actuator surfaces and arranged to conduct a fluid from the reservoir to an electrode for conducting one or more droplet operations.

According to another embodiment of the present invention, a droplet actuator is provided and comprises a base substrate and a top plate separated to form a gap, wherein the base substrate comprises a hydrophobic surface facing the gap and electrodes arranged to conduct droplet operations in the gap. An opening provides a fluid path from an exterior of the droplet actuator into the gap, wherein the opening is provided in the top plate and/or in the base substrate and/or between the top plate and base substrate. The droplet actuator further comprises a wettable path provided on one or more droplet actuator surfaces and arranged to conduct fluid from the opening to an electrode for conducting one or more droplet operations.

According to yet another embodiment of the present invention, a method of dispensing a droplet from a droplet source is provided and comprises flowing fluid from the droplet source along a wettable path provided on a surface of a droplet actuator and into proximity with a first electrode. The method further comprises activating the first electrode alone or in combination with one or more additional electrodes to extend fluid into the gap to provide a droplet in the gap.

6 DEFINITIONS

As used herein, the following terms have the meanings indicated.

"Activate" with reference to one or more electrodes means effecting a change in the electrical state of the one or more electrodes which results in a droplet operation.

"Bead," with respect to beads on a droplet actuator, means any bead or particle that is capable of interacting with a droplet on or in proximity with a droplet actuator. Beads may be any of a wide variety of shapes, such as spherical, generally spherical, egg shaped, disc shaped, cubical and other three dimensional shapes. The bead may, for example, be capable of being transported in a droplet on a droplet actuator; configured with respect to a droplet actuator in a manner which permits a droplet on the droplet actuator to be brought into contact with the bead, on the droplet actuator and/or off the droplet actuator. Beads may be manufactured using a wide variety of materials, including for example, resins, and polymers. The beads may be any suitable size, including for example, microbeads, microparticles, nanobeads and nanoparticles. In some cases, beads are magnetically responsive; in other cases beads are not significantly magnetically responsive. For magnetically responsive beads, the magnetically responsive material may constitute substantially all of a bead or one component only of a bead. The remainder of the bead may include, among other things, polymeric material, coatings, and moieties which permit attachment of an assay reagent. Examples of suitable magnetically responsive beads are described in U.S. Patent Publication No. 2005-0260686, entitled, "Multiplex flow assays preferably with magnetic particles as solid phase," published on Nov. 24, 2005, the entire disclosure of which is incorporated herein by reference for its teaching concerning magnetically responsive materials and beads. It should also be noted that various droplet operations described herein which can be conducted using beads can also be conducted using biological particles including whole organisms, cells, and organelles.

"Droplet" means a volume of liquid on a droplet actuator which is at least partially bounded by filler fluid. For example, a droplet may be completely surrounded by filler fluid or may be bounded by filler fluid and one or more surfaces of the droplet actuator. Droplets may take a wide variety of shapes; nonlimiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more surfaces of a droplet actuator.

"Droplet operation" means any manipulation of a droplet on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to size of the resulting droplets (i.e., the size of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be mediated by electrodes and/or electric fields, using a variety of techniques, such as, electrowetting and/or dielectrophoresis.

The terms "top" and "bottom" are used throughout the description with reference to the top and bottom substrates of the droplet actuator for convenience only, since the droplet actuator is functional regardless of its position in space.

When a given component such as a layer, region or substrate is referred to herein as being disposed or formed "on" another component, that given component can be directly on the other component or, alternatively, intervening components (for example, one or more coatings, layers, interlayers, electrodes or contacts) can also be present. It will be further understood that the terms "disposed on" and "formed on" are used interchangeably to describe how a given component is positioned or situated in relation to another component. Hence, the terms "disposed on" and "formed on" are not intended to introduce any limitations relating to particular methods of material transport, deposition, or fabrication.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a droplet actuator, it should be understood that the droplet is arranged on the droplet actuator in a manner which facilitates using the droplet actuator to conduct droplet operations on the droplet, the droplet is arranged on the droplet actuator in a manner which facilitates sensing of a property of or a signal from the droplet, and/or the droplet has been subjected to a droplet operation on the droplet actuator.

7 BRIEF DESCRIPTION OF THE DRAWINGS

Figure 6:
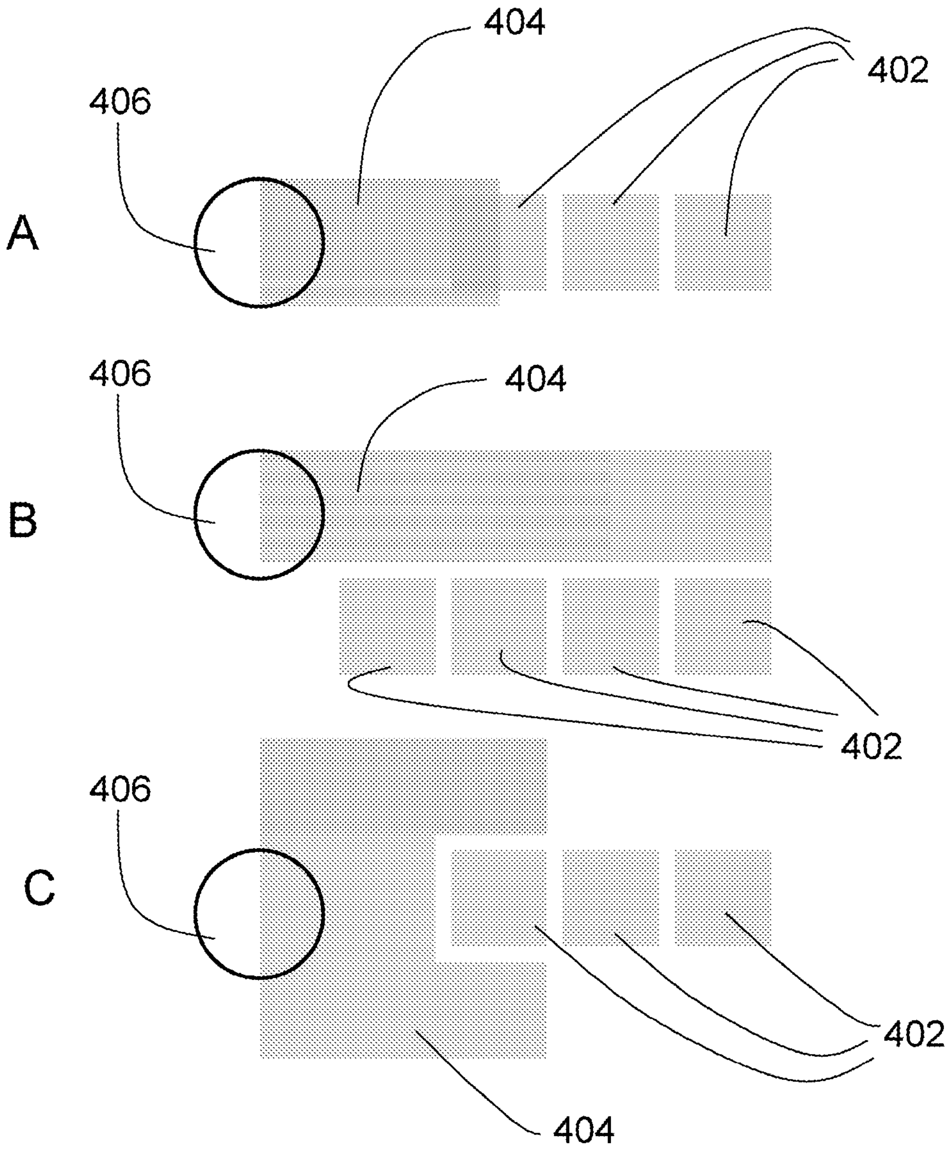
Figure 7:
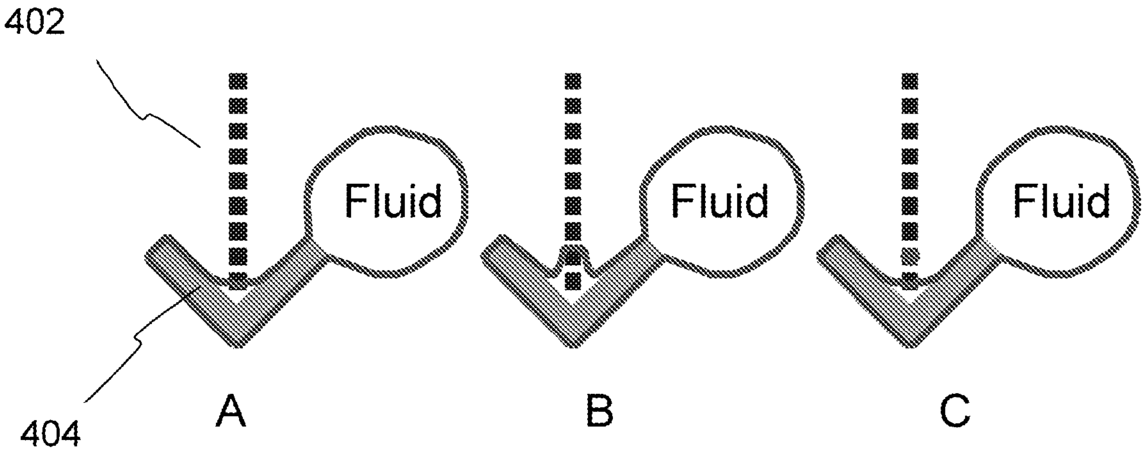

FIG. 6 illustrates several possible arrangements of the wettable surface in relation to the electrode path on a droplet actuator in accordance with embodiments of the present invention; and FIG. 7 illustrates an embodiment in which the wettable path on a droplet actuator includes sharp turns such that the droplet cannot conform completely to the wettable path, in accordance with an embodiment of the present invention.

8 DETAILED DESCRIPTION OF THE INVENTION

The invention provides a droplet actuator having a surface having a relatively increased wettability relative to the surrounding surface to facilitate loading of a fluid onto the droplet actuator. In general, the droplet actuator may have two substrates separated by a gap to form a chamber and may include in various arrangements electrodes for conducting droplet operations in the gap. The wettable surface may be arranged in any manner which facilitates loading of a fluid into the gap. The wettable surface may in some cases be more wettable and/or more hydrophilic than the surrounding surface and may be arranged in any manner which facilitates loading of a fluid into the gap. Typically, the wettable surface will be arranged so that the fluid will flow into the gap and into proximity with one or more of the electrodes. In some cases the fluid will flow without added pressure into the gap and into proximity with one or more of the electrodes. In other cases, sufficient pressure may be applied to force the fluid onto the wettable surface but not significantly beyond the bounds of the wettable surface. The wettable surface may be selected so that the fluid being loaded will have a contact angle with the surface which is greater than the contact angle of the fluid on the surrounding surface. In some cases, the wettable surface may be selected so that the fluid being loaded will have a contact angle which is less than about 90, 80, 70, 60, 50, 30, 20, 10, or 5 degrees. The wettable surface is arranged so that the fluid comes in sufficient proximity to one or more electrodes to ensure that the fluid can be manipulated by the one or more of the electrodes.

8.1 Droplet Actuator With Wettable Loading Surface

Figure 1:
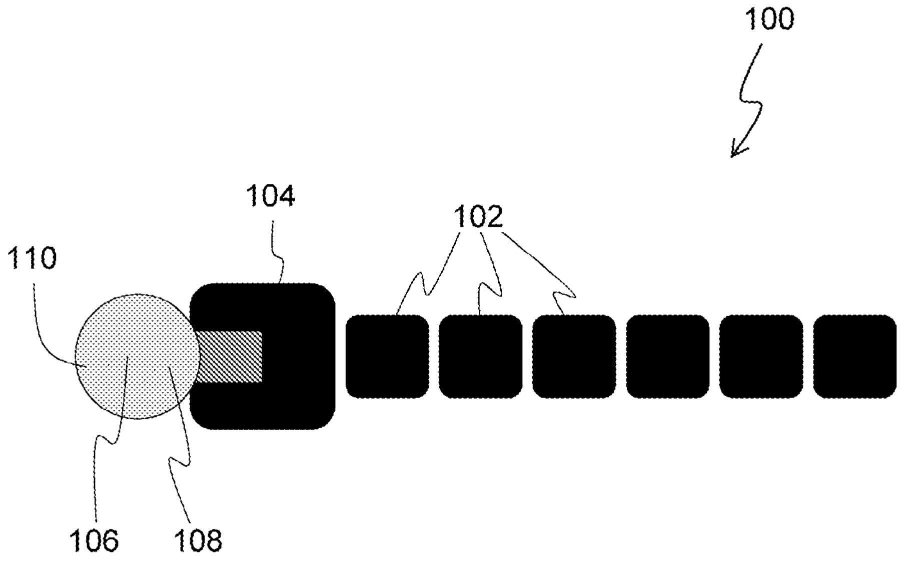
FIG. 1 is a top view illustration of the loading and transport components of a droplet actuator in accordance with an embodiment of the present invention.

FIG. 1 illustrates the loading and transport components 100 of a droplet actuator from a top view perspective. The figure includes transport electrodes 102, a reservoir electrode 104, a wettable surface 108, and an opening 106. As shown here, the transport electrodes 102 and reservoir electrode 104, are arranged on the bottom substrate; the wettable surface 108 is on the top substrate and the opening 106 is in the top substrate, providing a fluid path from the reservoir into the gap between the substrates. For example, the transport electrodes 102 and reservoir electrode 104, may be arranged on the top surface of the bottom substrate; the wettable surface 108 may be provided on the bottom surface of the top substrate and the opening 106 may penetrate the top substrate, providing a fluid path from the top surface of the top substrate into the gap between the substrates. However, it will be appreciated that a variety of alternative arrangements is possible. For example, the opening 106 may be provided in the bottom substrate and may provide a fluid path to an external reservoir. Similarly, the transport electrodes 102 and/or reservoir electrode 104 may be provided on the top substrate.

FIG. 1 shows an exterior reservoir 110 positioned atop the top substrate. The exterior reservoir may also be associated with or replaced with a sample processing mechanism, such as a filtration mechanism. These elements are arranged so that fluid flows from the exterior reservoir 110, through the opening 106 into the gap, then along the wettable surface 108, into proximity with the reservoir electrode 104, such that the reservoir electrode 104 and the transport electrodes 102 can be used to conduct droplet operations on the fluid.

Figure 2:
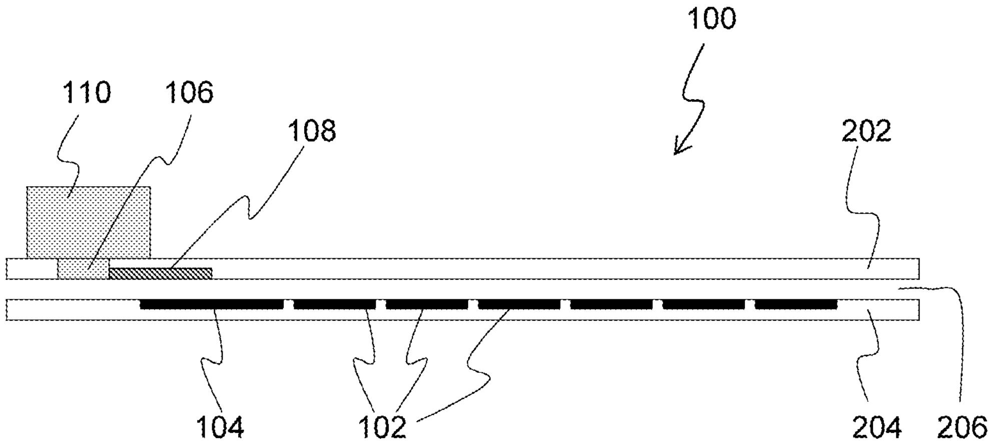
FIG. 2 is a side view illustration of the droplet actuator shown in FIG. 1 in accordance with an embodiment of the present invention.

FIG. 2 illustrates a side view of the loading and transport components 100 of the embodiment shown in FIG. 1 for the embodiment in which the opening 106 is in the same substrate as the wettable surface 108. In addition to the elements described above, FIG. 2 illustrates the top substrate 202 and bottom substrate 204, and the gap 206 between the two substrates, which is filled with a filler fluid.

Figure 3:
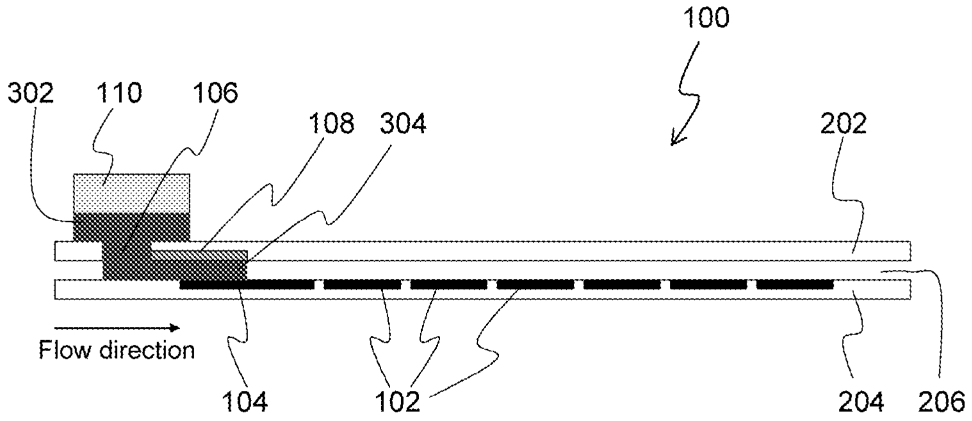
FIG. 3 is a side view illustration of the droplet actuator shown in FIG. 1 with fluid loaded in the reservoir in accordance with an embodiment of the present invention.

FIG. 3 illustrates a side view of the loading and transport components 100 with fluid 302 loaded in exterior reservoir 110. The figure illustrates how the presence of the wettable surface 108 causes fluid 304 to flow by capillary action from the exterior reservoir into the droplet actuator in the flow direction indicated, even when filler fluid (e.g., hydrophobic filler fluid) is present in the gap 206. This brings the fluid 304 into sufficient proximity with electrode 104 that electrodes 104 and 102 can be employed to conduct droplet operations on the fluid.

Figure 4:
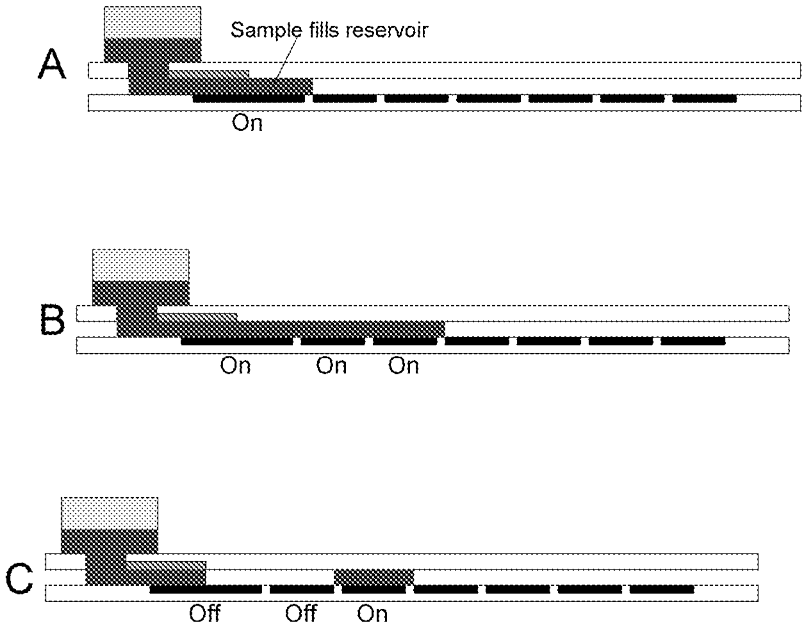
FIG. 4 is a side view illustration of a droplet dispensing operation in accordance with an embodiment of the present invention.

FIG. 4 illustrates a side view of a droplet dispensing operation using fluid that has been flowed onto the droplet actuator in a manner facilitated by the wettable surface. In FIG. 4A, the reservoir electrode is activated to further draw the fluid into the gap. In FIG. 4B, the two adjacent transport electrodes are also activated, thereby further extending the fluid into the gap. In FIG. 4C, the transport electrode adjacent to the reservoir electrode is deactivated causing a droplet to be formed on the adjacent transport electrode. This droplet may be transported elsewhere on the droplet actuator and/or otherwise subjected to further droplet operations. It should be noted that while this embodiment is described in terms of having a reservoir electrode adjacent to transport electrodes, it is not necessary to differentiate the electrodes in this manner. In accordance with the invention, the electrodes may all be droplet operation electrodes of substantially the same or different sizes and shapes. Further, it will be appreciated that a wide variety of on/off sequences may be used to dispense droplets.

Figure 5:
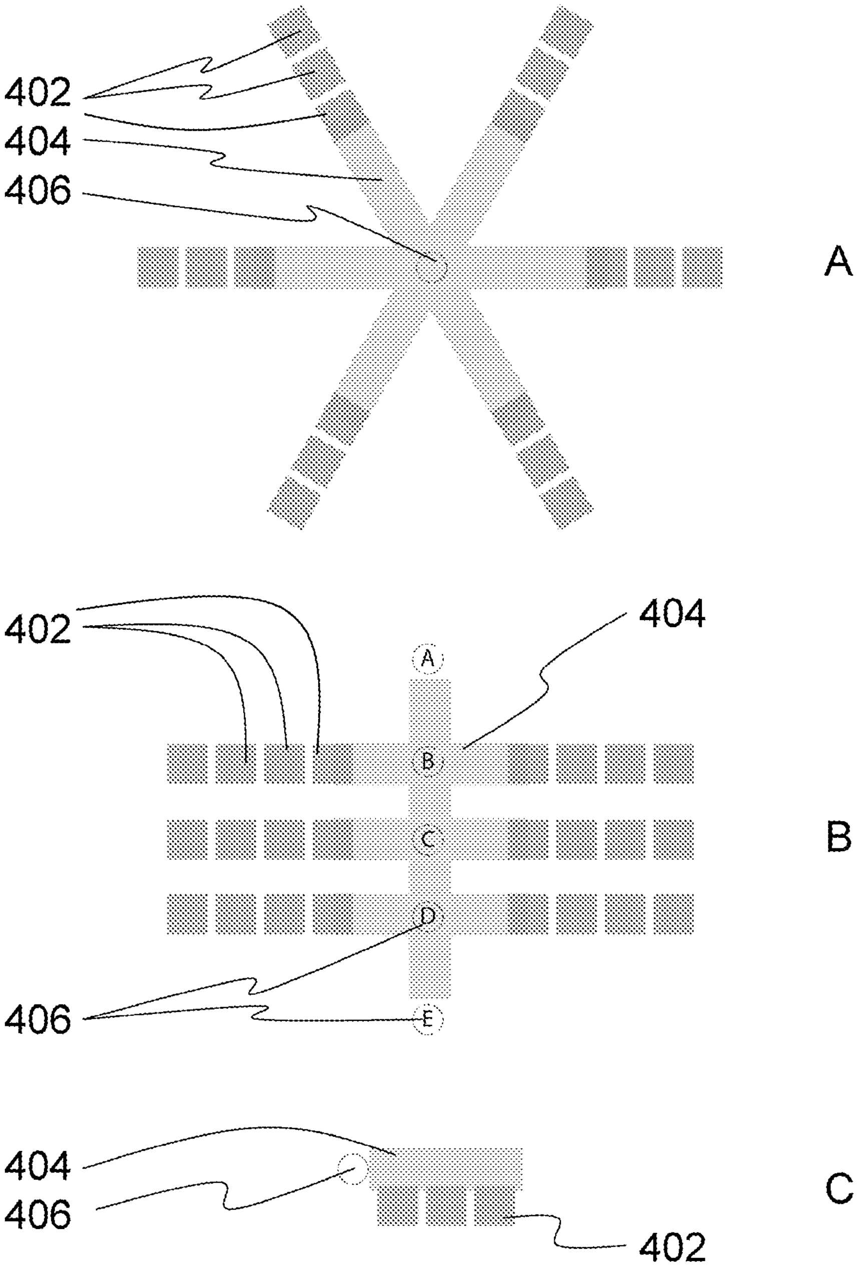
FIG. 5 illustrates a variety of shapes for routing fluid to multiple locations on a droplet actuator in accordance with embodiments of the present invention.

The wettable surface or path may be presented in any of a wide variety of arrangements which permit the wettable surface to face the fluid being loaded. For example, the wettable surface may be on the bottom surface of the top substrate, and/or the top surface of the bottom substrate, or on a surface located between the top and bottom substrates. Further, the wettable surface may be presented in a variety of shapes. The shapes may be selected to route the fluid to the desired location in proximity with the electrodes. FIG. 5 shows a variety of shapes for routing fluid to multiple locations on a droplet actuator. In these embodiments, the fluid is routed through the opening 406, along the wettable surface 404 into proximity with one or more electrodes 402. FIG. 5A, illustrates an embodiment in which a central opening 406 is provided adjacent to a wettable surface 404 that radiates out from the opening 406. As illustrated in FIG. 5B, various alternatives openings are possible, as illustrated by alternative openings A, B, C, D, and E, multiple openings may also be employed. FIG. 5C illustrates an embodiment in which the wettable surface 404 is substantially adjacent to the electrode path made up of electrodes 402, such that fluid may be introduced alongside the electrode path via the wettable surface 404. Activation of one or more of the electrodes 402 will facilitate flow of the fluid onto the electrode path.

FIG. 6 illustrates several possible arrangements of the wettable surface in relation to the electrode path. FIG. 6A represents an embodiment in which the wettable surface 404 substantially overlaps one or more electrodes 402 to bring the fluid into proximity with electrodes 402. FIG. 6B represents an embodiment in which the wettable surface 404 lies substantially adjacent to but does not directly overlap electrodes 402. This embodiment may be preferred in certain cases where direct overlap between the wettable surface and electrodes is undesirable due to incompatibilities with the process or materials used to form each part. Fluid introduced alongside the electrode path via the wettable surface can be made to flow onto the electrode path by activation of one or more electrodes. FIG. 6C illustrates a further embodiment in which the wettable surface 404 includes corners or sharp bends designed to bring the liquid into overlap with the electrode 402 while still retaining a separation between the wettable surface and electrode. Because the liquid cannot conform exactly to the shape of the wettable path at the corners a portion of the droplet deviates from the path and is arranged in sufficient proximity to one or more electrodes to permit execution of a droplet operation. Any of the exemplary embodiments shown in FIG. 6 can be used alone or in combination with a routing scheme such as shown in FIG. 5.

FIG. 7 illustrates an embodiment in which the wettable path includes sharp turns such that the droplet cannot conform completely to the wettable path, and a portion of the droplet which deviates from the path is arranged in sufficient proximity to one or more electrodes to permit execution of a droplet operation. FIG. 7A illustrates fluid flowing along the wettable surface or path 404, which is generally L-shaped. The fluid in the angle of the L-shaped wettable surface 404 cannot make the sharp turn required to conform to the L, thus it departs from the fluid path in the angle. This departure brings the fluid into proximity with electrodes 402. FIG. 7B illustrates activation of electrodes to cause an elongated portion of fluid to form along the electrode path. FIG. 7C shows deactivation of an intermediate electrode to form a droplet on the electrode path.

Where a high degree of precision is required in droplet dispensing, e.g. for conducting sensitive assay protocols, the amount of fluid in the external reservoir 110 may need to be regulated to ensure that changes in the reservoir fluid volume due to dispensing of the droplets does not significantly impact the precision of subsequent dispensing operations. In an alternative approach, the system of the invention can be coupled via an electrode path to a subsequent internal reservoir isolated from the first reservoir so that droplets can be dispensed, then transported along the electrode path to the subsequent internal reservoir where they may be pooled and dispensed again. In this manner, the volume of fluid in the subsequent internal reservoir can be carefully controlled so that droplet dispensing can be effected in a highly precise manner. Further, the external reservoir may in some embodiments be continually replenished, e.g., using a pump, such as a syringe pump.

It should also be noted that while the examples described above make reference to the opening 106 in the top substrate, such an opening is not necessarily required. The fluid can, for example, be introduced into the droplet actuator via the gap between the two substrates. In some embodiments, a fitting may be present permitting a remotely located reservoir to be coupled in fluid communication with the gap. For example, the fitting may permit a syringe to be fitted, or a hollow needle or glass capillary to positioned within the gap for dispensing fluid into contact with the wettable surface.

8.2 Droplet Actuator

For examples of droplet actuator architectures suitable for use with the present invention, see U.S. Pat. No. 6,911,132, entitled "Apparatus for Manipulating Droplets by Electrowetting-Based Techniques," issued on Jun. 28, 2005 to Pamula et al.; U.S. patent application Ser. No. 11/343,284, entitled "Apparatuses and Methods for Manipulating Droplets on a Printed Circuit Board," filed on filed on Jan. 30, 2006; U.S. Pat. Nos. 6,773,566, entitled "Electrostatic Actuators for Microfluidics and Methods for Using Same," issued on Aug. 10, 2004 and 6,565,727, entitled "Actuators for Microfluidics Without Moving Parts," issued on Jan. 24, 2000, both to Shenderov et al.; Pollack et al., International Patent Application No. PCT/US2006/47486, entitled "Droplet-Based Biochemistry," filed on Dec. 11, 2006, the disclosures of which are incorporated herein by reference.

8.3 Fluids

For examples of fluids that may be loaded using the approach of the invention, see the patents listed in section 8.2, especially International Patent Application No. PCT/US 06/47486, entitled "Droplet-Based Biochemistry," filed on Dec. 11, 2006. In some embodiments, the fluid loaded includes a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, fluidized tissues, fluidized organisms, biological swabs and biological washes. In some embodiment, the fluid loaded includes a reagent, such as water, deionized water, saline solutions, acidic solutions, basic solutions, detergent solutions and/or buffers. In some embodiments, the fluid loaded includes a reagent, such as a reagent for a biochemical protocol, such as a nucleic acid amplification protocol, an affinity-based assay protocol, a DNA sequencing protocol, and/or a protocol for analyses of biological fluids.

8.4 Filler Fluids

The gap will typically be filled with a filler fluid. The filler fluid may, for example, be a low-viscosity oil, such as silicone oil. Other examples of filler fluids are provided in International Patent Application No. PCT/US2006/47486, entitled "Droplet-Based Biochemistry," filed on Dec. 11, 2006.

8.5 Making the Droplet Actuator with Wettable Surface

A wide variety of approaches is possible for preparing a wettable surface on a droplet actuator. Often the top and/or bottom substrates of the droplet actuator will include a hydrophobic coating, such as a Teflon coating or a hydrophobizing silane treatment. The hydrophobic coating can be selectively removed to expose a relatively wettable surface, e.g., glass or acrylic, underneath. For example, the hydrophobic coating may be selectively removed by abrading or vaporizing the coating using a laser, ion milling, e-beam, mechanical machining or other techniques. Chemical techniques can also be used to selectively etch the hydrophobic coating material or to remove a selectively deposited underlying layer as in a "lift-off" process. Alternatively, the area in which the wettable surface is desirable may be masked prior to coating with the hydrophobic material, so that an uncoated wettable surface remains after coating with the hydrophobic material. For example, a layer of photoresist can be patterned on a wettable glass substrate prior to silanization of the surface using a hydrophobic silane. The photoresist can then be removed to expose wetting surfaces within a non-wetting field. Alternatively, rather than pattern the hydrophobic layer by selective removal or deposition, an additional wetting layer can be deposited and patterned on top of the hydrophobic layer. For example, silicon dioxide can be deposited and patterned on the hydrophobic material to create the wettable surfaces. Other examples of techniques for creating a wettable surface include plasma treatment, corona discharge, liquid-contact charging, grafting polymers with hydrophilic groups, and passive adsorption of molecules with hydrophilic groups.

9 CONCLUDING REMARKS

The foregoing detailed description of embodiments refers to the accompanying drawings, which illustrate specific embodiments of the invention. Other embodiments having different structures and operations do not depart from the scope of the present invention.

This specification is divided into sections for the convenience of the reader only. Headings should not be construed as limiting of the scope of the invention.

It will be understood that various details of the present invention may be changed without departing from the scope of the present invention. Furthermore, the foregoing description is for the purpose of illustration only, and not for the purpose of limitation, as the present invention is defined by the claims as set forth hereinafter.

We claim:

1. A droplet actuator comprising a first substrate and a second substrate, wherein:

(a) the first substrate comprises one or more electrodes configured for conducting one or more droplet operations; and (b) the second substrate is arranged in relation to the first substrate and spaced from the surface of the first substrate by a distance to define a space between the first substrate and second substrate, wherein the space comprises a fluid, and wherein the distance is sufficient to contain the fluid disposed in the space;

(c) the first or second substrate comprises a wettable surface defining a wettable path, wherein the wettable path is not an electrode path, and wherein the wettable path is defined from a position accessible to an exterior locus of the droplet actuator into an internal locus of the droplet actuator sufficient to:

(i) cause the fluid from the external locus to flow from the external locus to the internal locus, or (ii) permit the fluid to be forced into the internal locus by a force sufficient to traverse the wettable surface without extending sufficiently beyond the internal locus;

(d) the internal locus is in sufficient proximity to one or more of the electrodes such that activation of the one or more electrodes results in a droplet operation.

2. The droplet actuator of claim 1 wherein the wettable surface is selected so that the fluid has a contact angle with the wettable surface which is less than about 90 degrees.

3. The droplet actuator of claim 1 wherein the wettable surface is selected so that the fluid has a contact angle with the wettable surface which is less than about 50 degrees.

4. The droplet actuator of claim 1 wherein the wettable surface is selected so that the fluid has a contact angle with the wettable surface which is less than about 10 degrees.

5. The droplet actuator of claim 1 wherein the wettable surface is selected so that the fluid has a contact angle with the wettable surface which is approximately 0 degrees.

6. The droplet actuator of claim 1 wherein the wettable surface is uncoated glass surrounded by teflon or cytop coated glass.

7. The droplet actuator of claim 1 comprising the fluid on the wettable path, wherein the fluid is at least partially surrounded by a filler fluid.

8. The droplet actuator of claim 7 wherein the fluid comprises beads.

9. The droplet actuator of claim 7 wherein the fluid comprises biological cells.

10. A method of loading a droplet actuator with a fluid, the method comprising providing a droplet actuator of claim 1, flowing the fluid along the wettable path, and into proximity with one or more of the electrodes.

11. The method of claim 10 further comprising activating one or more of the electrodes to extend the fluid further into the droplet actuator.

12. A droplet actuator comprising a substrate comprising:

(a) one or more electrodes configured for conducting one or more droplet operations on a droplet operations surface of the substrate;

(b) a fluid reservoir;

(c) a wettable surface defining a wettable path from the fluid reservoir into a locus which is in sufficient proximity to one or more of the electrodes such that activation of the one or more electrodes results in a droplet operation; and (d) a fluid on the wettable path, wherein the wettable path is not an electrode path.

13. The droplet actuator of claim 12 comprising the fluid on the wettable path, wherein the fluid is at least partially surrounded by a filler fluid.

14. The droplet actuator of claim 13 wherein the fluid comprises beads.

15. The droplet actuator of claim 13 wherein the fluid comprises biological cells.

16. A droplet actuator comprising a substrate comprising:

(a) one or more electrodes configured for conducting one or more droplet operations on a droplet operations surface of the substrate;

(b) a wettable surface defining a wettable path from a first portion of the substrate into a locus which is sufficiently near to one or more of the electrodes that activation of the one or more electrodes results in a droplet operation; and (c) a fluid on the wettable path, wherein the wettable path is not an electrode path.

17. The droplet actuator of claim 16 comprising the fluid on the wettable path, wherein the fluid is at least partially surrounded by a filler fluid.

18. The droplet actuator of claim 17 wherein the fluid comprises beads.

19. The droplet actuator of claim 17 wherein the fluid comprises biological cells.

20. A droplet actuator comprising:

(a) a base substrate and a top plate separated to form a gap, wherein the base substrate comprises:

(i) a hydrophobic surface facing the gap; and (ii) electrodes arranged to conduct droplet operations in the gap;

(b) a fluid;

(c) a reservoir in the gap or in fluid communication with the gap;

(d) a wettable path:

(i) provided on one or more droplet actuator surfaces; and (ii) arranged to conduct a fluid from the reservoir to an electrode for conducting one or more droplet operations, wherein the wettable path is not an electrode path.

21. The droplet actuator of claim 20 wherein the wettable path is selected to provide a contact angle between an aqueous droplet and a surface of the path, which angle is less than about 90 degrees.

22. The droplet actuator of claim 20 wherein the wettable path is selected to provide a contact angle between an aqueous droplet and a surface of the path, which angle is less than about 50 degrees.

23. The droplet actuator of claim 20 wherein the wettable path is selected to provide a contact angle between an aqueous droplet and a surface of the path, which angle is less than about 30 degrees.

24. The droplet actuator of claim 20 wherein the wettable path is provided on a surface of the top plate facing the gap and extends from the reservoir to a position which overlaps a base substrate electrode.

25. The droplet actuator of claim 20 wherein the wettable path is arranged to conduct fluid from the reservoir to two or more electrodes for conducting droplet operations sufficient to provide multiple droplets in the gap.

26. The droplet actuator of claim 20 wherein the wettable path is arranged at least in part on a surface of the top plate facing the gap.

27. The droplet actuator of claim 20 wherein the wettable path is arranged at least in part on a surface of the bottom plate facing the gap.

28. The droplet actuator of claim 20 wherein the wettable path is arranged at least in part on a surface between the top and bottom substrates.

29. The droplet actuator of claim 20 comprising the fluid on the wettable path, wherein the fluid is at least partially surrounded by a filler fluid.

30. The droplet actuator of claim 29 wherein the fluid comprises beads.

31. The droplet actuator of claim 29 wherein the fluid comprises biological cells.

32. A droplet actuator comprising:

(a) a base substrate and a top plate separated to form a gap, wherein:
  (i) the base substrate comprises:
    (1) a hydrophobic surface facing the gap; and
    (2) electrodes arranged to conduct droplet operations in the gap; and
  (ii) an opening provides a fluid path from an exterior of the droplet actuator into the gap, wherein the opening is provided:
    (1) in the top plate; and/or
    (2) in the base substrate; and/or
    (3) between the top plate and base substrate;
(b) a fluid; and
(c) a wettable path:
  (i) provided on one or more droplet actuator surfaces; and
  (ii) arranged to conduct the fluid from the opening to an electrode for conducting one or more droplet operations, wherein the wettable path is not an electrode path.

33. The droplet actuator of claim 32 wherein the opening is in the top plate and the droplet actuator further comprises a reservoir on the top plate in fluid communication with the opening.

34. The droplet actuator of claim 32 wherein the wettable path is provided on a surface of the top plate facing the gap and extends from the opening to a position which overlaps a base substrate electrode.

35. The droplet actuator of claim 32 wherein the wettable path is arranged to conduct fluid from the opening to two or more electrodes for conducting droplet operations sufficient to provide multiple droplets in the gap.

36. The droplet actuator of claim 32 comprising the fluid on the wettable path, wherein the fluid is at least partially surrounded by a filler fluid.

37. The droplet actuator of claim 36 wherein the fluid comprises beads.

38. The droplet actuator of claim 36 wherein the fluid comprises biological cells.

39. A system comprising the droplet actuator of claim 33 comprising means for monitoring and controlling fluid volume in the reservoir and thereby facilitating production of droplet volumes that are more precise than droplet volumes using the droplet actuator in the absence of such sensing and monitoring.

40. A method of dispensing a fluid from a droplet source, the method comprising:

(a) flowing the fluid from the droplet source:
  (i) along a wettable path provided on a surface of a droplet actuator, wherein the wettable path is not an electrode path; and
  (ii) into proximity with a first electrode;
(b) activating the first electrode alone or in combination with one or more additional electrodes to extend the fluid into the gap to provide a droplet in the gap.

41. The method of claim 40 further comprising deactivating an intermediate electrode among the first electrode and one or more additional electrodes to provide the droplet in the gap.

42. The method of claim 41 wherein:

(a) the activating step comprises activating:
  (i) the first electrode; and
  (ii) a second electrode adjacent to the first electrode; and
(b) the deactivating step comprises deactivating the first electrode.

43. The method of claim 41 wherein:

(a) the activating step comprises activating:
  (i) the first electrode;
  (ii) a second electrode adjacent to the first electrode; and
  (iii) a third electrode adjacent to the second electrode; and
(b) the deactivating step comprises deactivating the second electrode.

44. The method of claim 41 further comprising:

(a) transporting droplets produced in the deactivating step to a reservoir in the gap; and
(b) dispensing a droplet from the second reservoir;
(c) transporting a droplet produced in the deactivating step to the reservoir to substantially replace the dispensed droplet; (d) repeating step (b).

45. The method of claim 40 wherein the fluid comprises beads.

46. The method of claim 40 wherein the fluid comprises biological cells.

* * * * *